(12) United States Patent
Kani et al.

(10) Patent No.: US 12,451,266 B2
(45) Date of Patent: Oct. 21, 2025

(54) RADIONUCLIDE PRODUCTION METHOD AND RADIONUCLIDE PRODUCTION SYSTEM

(71) Applicant: HITACHI, LTD., Tokyo (JP)

(72) Inventors: Yuuko Kani, Tokyo (JP); Takahiro Tadokoro, Tokyo (JP); Yuichiro Ueno, Tokyo (JP)

(73) Assignee: HITACHI, LTD., Tokyo (JP)

(*) Notice: Subject to any disclaimer, the term of this patent is extended or adjusted under 35 U.S.C. 154(b) by 600 days.

(21) Appl. No.: 17/611,296

(22) PCT Filed: Mar. 2, 2020

(86) PCT No.: PCT/JP2020/008689
§ 371 (c)(1),
(2) Date: Nov. 15, 2021

(87) PCT Pub. No.: WO2020/261650
PCT Pub. Date: Dec. 30, 2020

(65) Prior Publication Data
US 2022/0208409 A1    Jun. 30, 2022

(30) Foreign Application Priority Data

Jun. 26, 2019    (JP) .................................. 2019-119137

(51) Int. Cl.
*G21G 1/00* (2006.01)
*G21G 1/06* (2006.01)
(Continued)

(52) U.S. Cl.
CPC ............... *G21G 1/001* (2013.01); *G21G 1/06* (2013.01); *G21G 1/10* (2013.01); *G21G 1/12* (2013.01)

(58) Field of Classification Search
CPC ............ G21G 1/001; G21G 1/04; G21G 1/06; G21G 1/10; G21G 1/12
See application file for complete search history.

(56) References Cited

U.S. PATENT DOCUMENTS 3,774,036 A * 11/1973 Gerhart ..................... G21H 5/00
250/493.1
4,782,231 A * 11/1988 Svoboda .................. G21G 4/08
423/2
(Continued)

FOREIGN PATENT DOCUMENTS

EP        2620950 A1     7/2013
GB     2 160 010 A    12/1985
(Continued)

OTHER PUBLICATIONS

International Search Report of PCT/JP2020/008689 dated Apr. 21, 2020.
(Continued)

*Primary Examiner* — Sharon M Davis
(74) *Attorney, Agent, or Firm* — MATTINGLY & MALUR, PC (57) ABSTRACT

A radionuclide production method and system makes it possible to separate a target radionuclide generated by irradiation with a radioactive ray, and to reduce the generation of a radioactive waste along with the separation. The radionuclide production method includes irradiating, with a radioactive ray, a target material in which a starting material nuclide is present, to generate a radionuclide; and eluting the radionuclide into a liquid by bringing the target material into contact with the liquid. The radionuclide production system includes a target material having a starting material nuclide; an irradiation unit for the target material that generates a radionuclide; and an elution unit that elutes the radionuclide into a liquid by bringing the target material into contact with
(Continued)

the liquid. For both the radionuclide production method and system, the target material is a porous body or a granular material through which the liquid is passable.

8 Claims, 4 Drawing Sheets (51) Int. Cl.
*G21G 1/10* (2006.01)
*G21G 1/12* (2006.01)

(56) References Cited

U.S. PATENT DOCUMENTS

| | | | |
|---|---|---|---|
| 5,586,153 | A | 12/1996 | Alvord |
| 6,299,666 | B1 | 10/2001 | Apostolidis et al. |
| 2006/0257315 | A1* | 11/2006 | Magill .................. G21G 1/12 424/1.11 |
| 2009/0191122 | A1 | 7/2009 | Moreno Bermudez et al. |
| 2010/0215137 | A1* | 8/2010 | Nagai ................... G21G 1/06 376/158 |
| 2012/0106691 | A1* | 5/2012 | Toth .................... G21G 1/001 376/156 |
| 2014/0029710 | A1* | 1/2014 | Wilson ................. G21G 1/001 228/176 |
| 2020/0082956 | A1* | 3/2020 | Brown .................... C22B 3/42 |
| 2021/0327602 | A1* | 10/2021 | Brown .................. G21G 1/001 |

FOREIGN PATENT DOCUMENTS

| | | |
|---|---|---|
| JP | 61-246699 A | 11/1986 |
| JP | 2002-517734 A | 6/2002 |
| JP | 2010-223937 A | 10/2010 |
| JP | 5145545 B2 | 2/2013 |
| JP | 2013-210309 A | 10/2013 |
| WO | 2012/039037 A1 | 3/2012 |

OTHER PUBLICATIONS

Japanese Office Action received in corresponding Japanese Application No. 2019-119137 dated Nov. 1, 2022.
"Technology for Domestic Production of 99Mo/99mTc using Activation Method", Feb. 20, 2015, Independent Administrative Institution of Japan Atomic Energy Agency Nuclear Science Research Division, pp. 1-28 w/partial translation.
Japanese Office Action received in corresponding Japanese Application No. 2019-119137 dated Apr. 18, 2023.
Extended European Search Report received in corresponding European Application No. 20831764.4 dated Jun. 23, 2023.

* cited by examiner

RADIONUCLIDE PRODUCTION METHOD AND RADIONUCLIDE PRODUCTION SYSTEM

TECHNICAL FIELD

The present invention relates to a radionuclide production method and a radionuclide production system using a nuclear reaction or radioactive decay caused by irradiation with a radioactive ray.

BACKGROUND ART

In the field of nuclear medicine, a radionuclide is used for diagnosis, treatment, and the like. The radionuclide binds to or is labeled with a drug that exhibits predetermined pharmacokinetics, and the drug is administered to a patient. Treatment by internal irradiation from a radionuclide and diagnosis based on a radioactive ray distribution are performed by utilizing an action of the drug to accumulate in a specific lesion, tissue, cell, and the like.

As the radionuclide used for treatment, actinium 225 (Ac-225), radium 223 (Ra-223), bismuth 213 (Bi-213), astatine 211 (At-211), and the like, which emit α-rays, and iodine 131 (I-131), yttrium 90 (Y-90), strontium 89 (St-89), and the like, which emit β-rays, are known. These radionuclides used for treatment are used in internal irradiation therapy for killing various cancer cells.

As the radionuclide used for diagnosis, technetium 99m (Tc-99m), gallium 67 (Ga-67), and the like, which emit γ-rays, and fluorine 18 (F-18), oxygen 15 (O-15), nitrogen 14 (N-14), carbon 11 (C-11), and the like, which emit β-rays, are known. These radionuclides used for diagnosis are used in single photon emission computed tomography (SPECT) and positron emission tomography (PET).

In general, the radionuclide is produced by a method in which a starting material nuclide is irradiated with a radioactive ray to generate a radionuclide by a nuclear reaction, and then a target radionuclide is chemically separated. As the radioactive ray for inducing the nuclear reaction, a charged particle beam, a neutron beam, a bremsstrahlung ray, and the like are used. As a radioactive ray source, a nuclear reactor, a cyclotron, a linear accelerator, or the like is used. Various methods such as precipitation separation, extraction separation, and chromatography are used for chemical separation of the target radionuclide.

Technetium 99m is meta stable in an excited state, and has a property of emitting γ-rays when undergoing a nuclear isomer transition in a ground state, and therefore is widely used as the radionuclide used for diagnosis. A general starting material of technetium 99m is molybdenum 99 (Mo-99). With β-decay of molybdenum 99, which is a parent nuclide, technetium 99m, which is a daughter nuclide, is generated.

Molybdenum 99 is mainly produced by a nuclear fission method in which nuclear fission products of uranium 235 (U-235) obtained in a nuclear reactor are separated and purified. However, production facilities of molybdenum 99 are few and unevenly distributed worldwide. In addition, a half-life of molybdenum. 99 is as short as about 66 hours, making it difficult to store molybdenum 99 over a long period of time. Therefore, in most cases, air transportation immediately before use is essential. In order to solve such a supply problem, new production methods such as a radiation method of radiating molybdenum trioxide, which is a natural isotope, or the like have been studied.

Technetium 99m used for various diagnoses has a short half-life of about 6 hours, and therefore is generated when necessary by a method called "milling". A device called a "generator" is used in the milling. The generator is a device filled with alumina in a column, and molybdate ions to which molybdenum 99 is bound are supported on alumina in the column. When the β-decay of molybdenum 99 occurs, the molybdate ions are converted into pertechnetate ions having a low affinity with alumina. Therefore, technetium 99m, which is the daughter nuclide, is eluted by passing a saline solution through the column, and is recovered in a chemical form of the pertechnetate ions.

Actinium 225 used for various treatments is a radionuclide that emits α-rays, and has a half-life of about 10 days, and therefore is expected to be widely used as a molecular target drug and the like. As described in PTL 1, actinium 225 is generated by a nuclear reaction [226Ra(p, 2n)225Ac] caused by proton rays using a target containing radium 226 (Ra-226).

Actinium 225 generated in the target is in a state of being mixed with unreacted radium 226 and the like. Therefore, as described in PTL 2, after a target irradiated with a radioactive ray is dissolved, multi-stage separation and purification is performed by chromatography or the like.

CITATION LIST

Patent Literature

PTL 1: JP-T-2002-517734
PTL 2: Japanese Patent No. 5145545

SUMMARY OF INVENTION

Technical Problem

In general, when producing a radionuclide, an operation of dissolving a target irradiated with a radioactive ray and an operation of separating and purifying the radionuclide in a dissolving solution are required. Usually, in the dissolving solution in which the target is dissolved, in addition to the target radionuclide, the starting material nuclide remaining unreacted and a descendant nuclide generated by the radioactive decay are mixed. Therefore, in many cases, the multi-stage separation and purification is required when recovering the target radionuclide.

However, when a separation and purification treatment is performed in multiple stages, there is a problem that operations performed in a hot cell become complicated, and production efficiency of a radionuclide product deteriorates. In addition, since production steps are complicated, a design constraint in the production facilities increases, and a production cost of the radionuclide product increases. Further, there is also a problem that a radioactive waste, including waste liquid and waste adsorbents, generated by the separation and purification treatment increases.

Therefore, an object of the invention is to provide a radionuclide production method and a radionuclide production system which make it possible to separate, using a simple operation, a target radionuclide generated by irradiation with a radioactive ray, and to reduce the generation of a radioactive waste along with the separation.

Solution to Problem

In order to solve the above problems, a radionuclide production method according to the invention includes: a step of irradiating, with a radioactive ray, a target material in which a starting material nuclide is present, to generate a radionuclide; and a step of eluting the radionuclide into a liquid by bringing the target material into contact with the liquid, in which the target material is a porous body or a granular material through which the liquid is passable.

Further, a radionuclide production system according to the invention includes: a target material in which a starting material nuclide is present; an irradiation unit that irradiates the target material with a radioactive ray to generate a radionuclide; and an elution unit that elutes the radionuclide into a liquid by bringing the target material into contact with the liquid, in which the target material is a porous body or a granular material through which the liquid is passable.

Advantageous Effect

According to the invention, it is possible to provide a radionuclide production method and a radionuclide production system which make it possible to separate, using a simple operation, a target radionuclide generated by irradiation with a radioactive ray, and to reduce the generation of a radioactive waste along with the separation.

DESCRIPTION OF EMBODIMENTS

<Radionuclide Production Method>

First, a radionuclide production method according to one embodiment of the invention will be described. In the following drawings, common components are denoted by the same reference numerals, and redundant descriptions thereof are omitted.

The radionuclide production method according to this embodiment is a method for producing a target radionuclide by using a nuclear reaction or radioactive decay caused by irradiation with a radioactive ray. This radionuclide production method includes, as main steps, a radioactive ray irradiation step of irradiating a target material with a radioactive ray to generate a radionuclide, and an elution step of eluting the target radionuclide into an eluent (liquid).

In the radionuclide production method according to this embodiment, as a target of the radioactive ray for inducing the nuclear reaction, a target material in which a starting material nuclide of the target radionuclide is present is used. In the radionuclide production method according to this embodiment, as such a target material, a porous body or a granular material through which the eluent (liquid) is passable is used.

Specific examples of the target radionuclide to be produced include technetium 99m (Tc-99m), actinium 225 (Ac-225), scandium 47 (Sc-47), and scandium 44 (Sc-44). However, the type of the radionuclide to be produced is not limited thereto.

(Radioactive Ray Irradiation Step)

In the radioactive ray irradiation step, the target material in which the starting material nuclide is present is irradiated with a predetermined type of radioactive ray having predetermined energy to generate the radionuclide. The target material, which is a porous body or a granular material, is irradiated with the radioactive ray, and a nuclear reaction of the starting material nuclide present in the target material is induced, whereby the starting material nuclide is converted into the radionuclide.

The target radionuclide to be produced may be a daughter nuclide whose parent nuclide is the starting material nuclide, or may be a descendant nuclide generated by the radioactive decay of the daughter nuclide. Examples of the radioactive decay by which the descendant nuclide is generated include α decay, $β^-$ decay, $β^+$ decay, and electron capture. The target radionuclide to be produced can be used for, by labeling any drug, therapeutic applications such as internal irradiation that kills various cancers, and diagnostic applications based on measurement results of a distribution of a generating source of the radioactive ray.

The target material can be formed of an appropriate material such as an inorganic substance, an organic substance, and a composite material combining these substances. As the inorganic substance, any of an inorganic simple substance, an inorganic compound, a metal simple substance, an alloy, an intermetallic compound, and the like can be used. As the organic substance, any of a synthetic resin, an organic polymer, an organic crystal, and the like can be used. However, the material of the target material is preferably an inorganic substance from a viewpoint of difficulty in radiation deterioration and a viewpoint of a small change in shape due to the radioactive ray and heat.

As the radioactive ray to be emitted to the target material, an appropriate type of radioactive ray having appropriate energy can be used according to the type of the nuclear reaction to be used. Specific examples of the radioactive ray include particle beams such as an electron beam, a proton beam, a heavy proton beam and an α-ray, a neutron beam, a γ-ray, and a bremsstrahlung ray.

In a case where the proton beam, α-ray, neutron beam, or the like is used as the radioactive ray to be emitted to the target material, since the transmission power of the radioactive ray is low, it is preferable to provide the target material in a thin shape, for example, a plate shape. On the other hand, in a case where the γ-ray, bremsstrahlung ray, or the like is used as the radioactive ray to be emitted to the target material, since the transmission power of the radioactive ray is high, the target material can be provided in a thick shape, for example, a columnar shape.

As the starting material nuclide, an appropriate nuclide can be used according to the type of the target radionuclide to be produced, the type of the nuclear reaction or the radioactive decay to be used. The starting material nuclide may be a radionuclide or a stable nuclide. However, it is necessary that the starting material nuclide and the target radionuclide to be produced be combined so as to be separable from each other by using the eluent.

As the starting material nuclide, it is preferable to use radium (Ra), rhenium (Re), hafnium (Hf), molybdenum (Mo), germanium (Ge), zinc (Zn), or titanium (Ti) from a viewpoint of the nuclear reaction. When isotopes of these elements are used, the bremsstrahlung ray can be used as the radioactive ray for inducing the nuclear reaction. Since electrons have a smaller mass than protons, heavy particles, or the like, an accelerator can be reduced in size under the same acceleration energy.

The starting material nuclide may be chemically contained in the target material itself, or may be embedded inside the target material, or may be supported on a surface of the target material. When the starting material nuclide is contained in the target material, the starting material nuclide does not need to be supported on the surface, and thus the number of preparing steps of the target material can be reduced. On the other hand, when the starting material nuclide is supported on the surface, the target material does not need to be dissolved when eluting the target radionuclide, and thus the target material is suitable for reuse.

In a case where the target material itself chemically contains the starting material nuclide, the target material may be a simple substance (pure substance containing one kind of element) containing the starting material nuclide, or may be a compound containing the starting material nuclide. When the target material is a simple substance, and the target radionuclide is eluted, other non-target elements are less likely to be mixed. Therefore, it is possible to simplify a separation and purification treatment for the target radionuclide. On the other hand, when the target material is a compound, a selection range of the material of the target material is widened.

In the case where the target material itself chemically contains the starting material nuclide, the target material is preferably formed of a material having a weak bonding force with the target radionuclide or a material having a weak bonding force with a substance containing the target radionuclide. For example, it is preferable that with the generation of the target radionuclide, the target material is formed of a nuclide that loses a chemical bond such as a covalent bond, a nuclide in which electrons in d orbital, f orbital, and the like are decreased, a nuclide in which polarity in the material is reversed, or the like. When the target material is such a material, the target radionuclide is easily eluted.

Similar to the case where the target material itself chemically contains the starting material nuclide, in a case where the starting material nuclide is embedded inside the target material or a case where the starting material nuclide is supported on the surface of the target material, the target material may be a simple substance (pure substance containing one kind of element) containing any nuclide, or may be a compound containing any nuclide. In these cases, the substance chemically containing the starting material nuclide may be embedded in or supported on the target material, or the substance chemically containing the starting material nuclide may be embedded in or supported on the target material in a state of being supported on another secondary carrier, for example, an adsorbent and an adhesive material such as a paste.

In the case where the starting material nuclide is supported on the surface of the target material, the target material may support the substance containing the starting material nuclide by any of methods of adsorption, electrodeposition, vapor deposition, and coating. According to these supporting methods, the substance containing the starting material nuclide can be uniformly adhered to the surface of the target material which is a porous body or a granular material. Since the uniformly adhered starting material nuclide is converted to the target radionuclide, a recovery rate of the target radionuclide by being passed through the eluent can be increased.

As the adsorption, any of physical adsorption by intermolecular force or the like, chemical adsorption by chemical bonding, and the like can be used. As the electrodeposition, any of cationic electrodeposition in which deposits are cations, anionic electrodeposition in which deposits are anions, and the like can be used. As the vapor deposition, any of physical vapor deposition such as vacuum deposition and sputtering, chemical vapor deposition such as thermal CVD and plasma CVD, and the like can be used. As the coating, any of coating, spotting, spraying, and the like can be used.

In the case where the starting material nuclide is embedded inside the target material or the case where the starting material nuclide is supported on the surface of the target material, it is preferable that the target material chemically contains an element having an atomic number smaller than that of the starting material nuclide. If the atomic number of the element contained in the target material is small, when the target material is irradiated with the radioactive ray, an unnecessary nuclear reaction caused by the target material itself is prevented. When eluting the target radionuclide, other non-target nuclides are less likely to be mixed, so that the separation and purification treatment for the target radionuclide can be simplified.

As the porous body constituting the target material, any of a porous substance, a porous structure, and a combination thereof may be used as long as such a porous body has through pores through which an eluent connected from a surface to a back surface can pass. In addition to the through pores, the porous body may have communicating pores communicating with the through pores, open pores connected to the surface of the porous body, and the like. A shape and arrangement of these pores may be regular or irregular.

Examples of the porous substance include, for example, a macroporous material having macropores, a mesoporous material having mesopores, and a microporous material having micropores. Specific examples of the macroporous material include pumice. Specific examples of the mesoporous material include inorganic compounds such as silicon dioxide, aluminum oxide, and titanium oxide. Specific examples of the microporous material include inorganic compounds such as zeolite, and carbon materials such as activated carbon.

Examples of the porous structure include, for example, a porosificated material in which a large number of pores are formed. Specific examples of the porosificated material include a sintered body of ceramic particles, metal particles, and resin particles, an adhered body of ceramic particles, metal particles, and resin particles, a laminated body of ceramic fibers, metal fibers, and resin fibers, a porous metal such as a ceramic honeycomb, a foamed ceramic, a mesh metal, an expanded metal, a punching metal, a foamed metal, and a metal sponge, a lotus metal, and a foamed resin.

As the granular material constituting the target material, any of particles such as fine particles, coarse particles, and granules, a pellet, a flake, a chip, a filament, a sheet, amorphous particles, and a combination thereof can be used as long as such a granular material is an aggregate in which passages through which the eluent can pass are formed between individuals. The individual granular material may be porous or non-porous.

A particle diameter of the granular material is not particularly limited as long as the particle diameter of the granular material is large to an extent that the entire eluent used is not absorbed and is small to an extent that the contact between the radionuclide generated in the individual particles and the eluent is sufficiently secured. The particle diameter of the granular material can be, for example, about several tens of micrometers to several millimeters.

Specific examples of the material of the target material or a material of a carrier that supports the starting material nuclide on the target material include metal materials such as iron, copper, zinc, tin, lead, nickel, titanium, aluminum, magnesium, and an alloy and stainless steel thereof, inorganic compounds such as silicon dioxide, silica gel, titanium dioxide, zirconium dioxide, aluminum oxide, magnesium oxide, silicon carbide, silicon nitride, boron nitride, and iron hydroxide, inorganic salts or minerals such as zeolite, acid clay, activated clay, apatite, a silicate, a carbonate, a phosphate, a borate, and a sulfate, and carbon materials such as activated carbon and fibrous carbon.

(Elution Step)

In the elution step, the radionuclide is eluted into the eluent (liquid) by bringing the target material into contact with the eluent (liquid). By bringing a predetermined eluent into contact with the target material which is a porous body or a granular material, the target radionuclide generated in the target material is eluted in an appropriate chemical form and recovered in the eluent.

A treatment of bringing the target material into contact with the eluent can be performed by a treatment of passing the eluent through the target material which is a porous body or a granular material, or a treatment of immersing the target material which is a porous body or a granular material in the eluent. According to such a treatment, in a case where an eluent having an appropriate dissolving power is used, the target radionuclide generated in the target material can be recovered in the eluent by a simple operation of one stage.

The treatment of bringing the target material into contact with the eluent can be performed by using an eluent in which an elution amount of a substance containing the target radionuclide is larger than an elution amount of a substance containing the starting material nuclide. Even in the case where the substance containing the starting material nuclide is eluted by using the eluent or the case where the substance containing the starting material nuclide is substantially not eluted, the target radionuclide can be recovered using a difference between the elution amounts. As for a state of the eluent to be used, it is particularly preferable that the solubility of the substance containing the target radionuclide is higher than the solubility of the substance containing the starting material nuclide.

As the eluent, an appropriate liquid can be used according to the type of the radionuclide to be produced and the material of the target material. As the eluent, any of an aqueous solvent such as water, an organic solvent, an acid, an alkali, a liquid having high ion intensity, a liquid capable of reacting and generating a soluble substance, and a liquid for dissociating a soluble substance by a decomposition reaction may be used as long as the substance containing the target radionuclide is eluted.

Specific examples of the eluent include water, an aqueous solution of water-soluble salts such as sodium chloride, potassium chloride, and calcium chloride, an inorganic acid aqueous solution or organic acid aqueous solution such as hydrochloric acid, nitric acid, nitrous acid, sulfuric acid, sulfurous acid, phosphoric acid, boric acid, carbonic acid, acetic acid, and citric acid, and an alkali aqueous solution of sodium hydroxide, potassium hydroxide, calcium hydroxide, sodium hydrogen carbonate, sodium carbonate, and ammonia. However, a type of the eluent is not limited to these examples.

It is particularly preferable that the eluent is water, a sodium chloride aqueous solution, hydrochloric acid (an aqueous solution of hydrochloric acid), nitric acid (an aqueous solution of nitric acid), or an aqueous alkali solution. When these eluents are used, after the substance containing the target radionuclide is eluted, non-target nuclides contained in the eluent can be removed by a simple separation and purification operation such as ion exchange.

(Subsequent Step)

After the elution step, the target material in which the target radionuclide is recovered or the target material after contact with the eluent can be further subjected to various subsequent steps.

For example, the eluent in which the target radionuclide is recovered can be subjected to a separation and purification treatment of removing impurities, a sterilization treatment of sterilizing microorganisms contaminated, a liquid property adjustment treatment of adjusting properties such as pH of the liquid, a concentration adjustment treatment of adjusting a concentration of the radionuclide, and the like.

On the other hand, the target material after contact with the eluent also can be discarded as a radioactive waste and the like, or can be reused for the generation of the radionuclide. Since the target material is a porous body or a granular material through which the eluent can pass, even after contact with the eluent, the target material often retains the function and shape in a certain degree. Therefore, a generation amount of the radioactive waste can be reduced by reusing the target material after contact with the eluent for the generation of the radionuclide.

The target material after contact with the eluent can be subjected to, before the target material is reused for the generation of the radionuclide, a washing treatment of removing the eluent or impurities, and a drying treatment of removing the adhered eluent and a washing liquid. The washing treatment can be performed using an appropriate washing liquid such as water or an organic solvent. The drying treatment can be performed using an appropriate method such as cold air drying, hot air drying, reduced-pressure drying, or infrared heating drying.

In addition, the target material after contact with the eluent can be replenished with the substance containing the starting material nuclide before the target material is reused for the generation of the radionuclide. In the target material after contact with the eluent, the target material itself, or the substance in/on which the starting material nuclide is embedded or supported is reduced in volume by the elution of the target radionuclide. Therefore, by replenishing the target material with the substance containing the starting material nuclide, it is possible to increase a re-production amount of the target radionuclide.

For example, in the case where the target material itself chemically contains the starting material nuclide, remolding can be performed by adding a new porous body in which the starting material nuclide is present, or a new granular material in which the starting material nuclide may be added. In addition, in the case where the starting material nuclide is embedded inside the target material or the case where the starting material nuclide is supported on the surface of the target material, a new substance containing the starting material nuclide can be additionally embedded or supported.

<Effects of Radionuclide Production Method>

According to the above-described radionuclide production method, since the porous body or the granular material through which the eluent can pass is used as the target of the radioactive ray for generating the radionuclide, it is possible to quickly recover the target radionuclide after the irradiation with the radioactive ray. An operation of dissolving the target irradiated with the radioactive ray in a liquid form through which a liquid can pass, instruments used for the operation, and the like become unnecessary. Therefore, it is possible to separate, using a simple operation, a target radionuclide generated by the irradiation with the radioactive ray, and to reduce the generation of the radioactive waste along with the separation. In addition, radiation exposure received by a worker of radionuclide production can also be reduced.

In addition, according to the above-described radionuclide production method, it is possible to integrally perform the operation of irradiating the starting material nuclide with the radioactive ray and the operation of separating the generated target radionuclide, and it is possible to recover the target radionuclide while irradiating with the radioactive ray. Therefore, it is possible to increase a degree of freedom in designing the production facilities, and to supply the radionuclide product at a more appropriate time. By using an eluent having an appropriate dissolving power, it is possible to simplify the separation and purification treatment necessary after the irradiation with the radioactive ray, and thus the generation of the radioactive waste along with the separation and purification and the radiation exposure received by the worker are also reduced.

<Radionuclide Production System>

Next, a radionuclide production system according to an embodiment of the invention will be described with reference to the drawings.

The radionuclide production system according to this embodiment is an apparatus for producing a target radionuclide by using a nuclear reaction or radioactive decay caused by irradiation with a radioactive ray. The radionuclide production system includes a device for performing the radioactive ray irradiation step and a device for performing the elution step.

The device for performing the radioactive ray irradiation step and the device for performing the elution step can be provided in a handling facility of the radioactive substance or in the vicinity of a series of hot caves, or can be provided integrally in one hot cell, the inside of a radioactive ray irradiation device, or the like.

Figure 1:
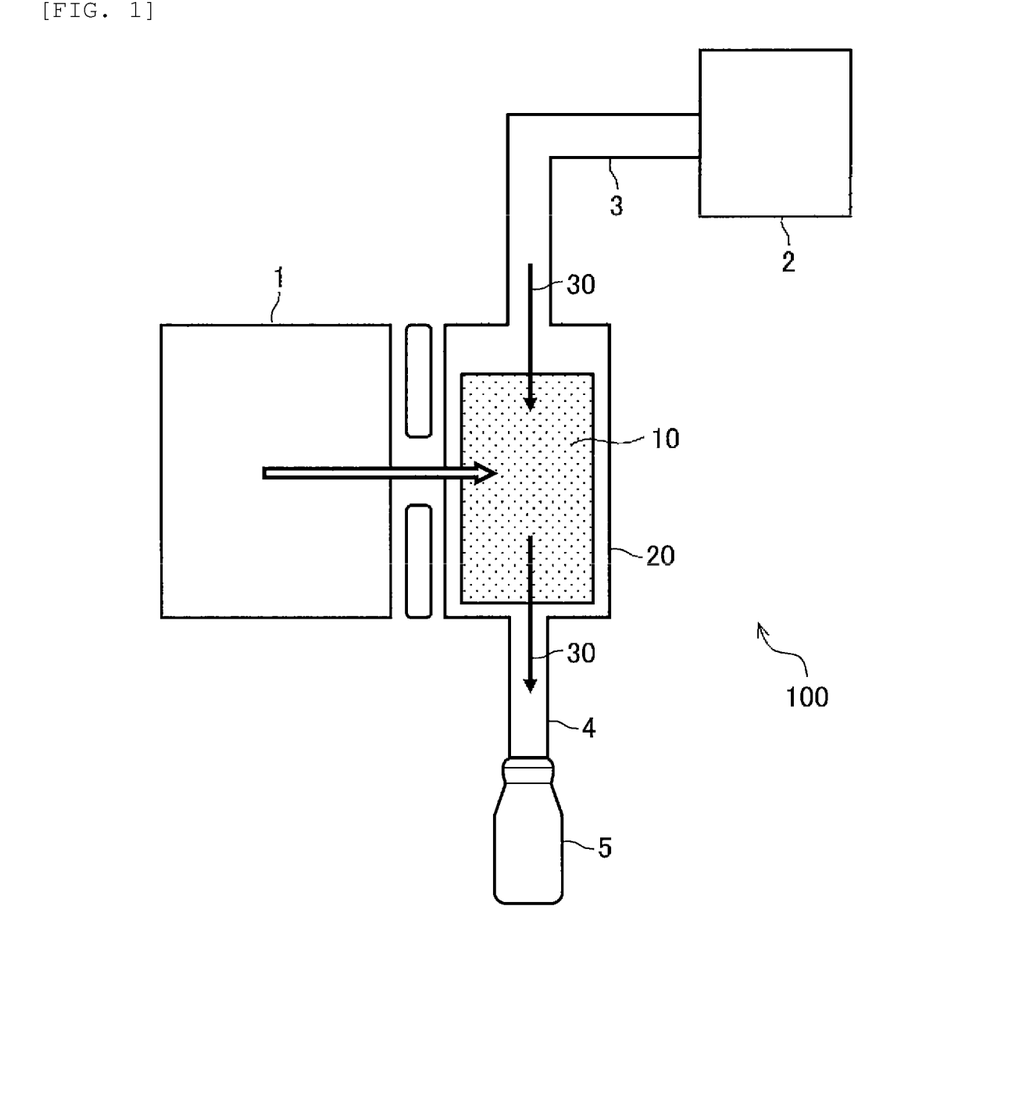
FIG. 1 is a diagram schematically showing an example of a radionuclide production system.

FIG. 1 is a diagram schematically showing an example of the radionuclide production system.

FIG. 1 illustrates a radionuclide production system 100 in which the device for performing the radioactive ray irradiation step and the device for performing the elution step are integrally provided.

As shown in FIG. 1, the radionuclide production system 100 includes a radioactive ray irradiation device (irradiation unit) 1 that irradiates a target material with a radioactive ray to generate a radionuclide, and an eluent supply device (elution unit) 2 that elutes the target radionuclide into an eluent (liquid) 30.

The radioactive ray irradiation device 1 includes a radioactive ray source that generates a radioactive ray. The radioactive ray irradiation device 1 is provided with a shielding chamber (not shown) surrounded by a shielding material. A target material 10 is disposed in such a shielding chamber. The radioactive ray irradiation device 1 irradiates the target material 10, which is a porous body or a granular material, with a predetermined type of radioactive ray having a predetermined energy, and induces a nuclear reaction of the starting material nuclide present in the target material 10, whereby the starting material nuclide is converted into a radionuclide.

The target material 10 is a porous body or a granular material through which the eluent (liquid) 30 can pass. In FIG. 1, the target material 10 is accommodated in a target container 20. The target container 20 is provided with a liquid inlet on one end side and a liquid outlet on the other end side.

The inlet provided on one end side of the target container 20 is connected to the eluent supply device 2 via a liquid pipe 3. The outlet provided on the other end side is connected to a recovery container 5 via a liquid pipe 4. The liquid pipes 3 and 4 can be provided integrally or detachably with respect to the target container 20.

The target container 20 can be formed of an appropriate material that has high transmissivity of the radioactive ray emitted from the radioactive ray irradiation device 1 and does not leak the eluent 30. Examples of such a material include a metal material such as a light metal and an inorganic material such as glass. The liquid pipes 3 and 4 can be formed of an appropriate material that does not leak the eluent 30.

The target container 20 accommodating the target material 10 is disposed in the shielding chamber (not shown) attached to the radioactive ray irradiation device 1. The target container 20 can be supported by a support body (not shown) in the shielding chamber. The support body can include, for example, a rotor or a rotary table that rotates the target container 20 such that the target container 20 is uniformly irradiated with the radioactive ray. The liquid pipes 3 and 4 can be formed of an organic material or the like to have flexibility so as not to interfere with such a support body.

As the radioactive ray irradiation device 1, various devices including an electron gun such as a thermoelectric type electron gun, a field emission type electron gun, and a Schottky type electron gun, an accelerator such as a linear accelerator and a cyclotron, and a target for radioactive ray generation can be used according to the type of the target radionuclide to be produced and the type of the nuclear reaction to be used. When a device including an accelerator that accelerates an electron beam and a target for bremsstrahlung ray generation is used as the radioactive ray irradiation device 1, the target radionuclide can be produced by a small device using bremsstrahlung.

The eluent supply device 2 includes a tank that stores the eluent 30 for eluting the target radionuclide, a pump that supplies the eluent 30 to the target container 20, and the like. The eluent supply device 2 brings the predetermined eluent 30 into contact with the target material 10, which is a porous body or a granular material, to elute the target radionuclide generated in the target material 10 in an appropriate chemical form and send the eluted target radionuclide to the recovery container 5.

In the radionuclide production system 100, the radiation ray irradiation by the radioactive ray irradiation device 1 and the passing through of the eluent 30 by the eluent supply device 2 can be performed stepwise in this order, or can be performed at the same time such that at least a part of these treatments overlap each other. When the radioactive ray irradiation and the passing through of the eluent 30 are performed at the same time, the eluent 30 containing the target radionuclide at a high concentration is less likely to be recovered, whereas a time required for the production of the radionuclide product may be shortened.

<Effects of Radionuclide Production System>

According to the above-described radionuclide production system, since the porous body or the granular material through which the eluent can pass is used as the target of the radioactive ray for generating the radionuclide, it is possible to quickly recover the target radionuclide after the irradiation with the radioactive ray. An operation of dissolving the target irradiated with the radioactive ray in a liquid form through which a liquid can pass, instruments used for the operation, and the like become unnecessary. Therefore, it is possible to separate, using a simple operation, a target radionuclide generated by the irradiation with the radioactive ray, and to reduce the generation of the radioactive waste along with the separation. In addition, radiation exposure received by a worker of the radionuclide production can also be reduced.

Furthermore, according to the above-described radionuclide production system, since the device that irradiates the starting material nuclide with the radioactive ray and the device that separates the generated target radionuclide are integrated, an apparatus capable of recovering the target radionuclide while emitting the radioactive ray is configured. Therefore, it is possible to increase a degree of freedom in designing the production facilities, and to supply the radionuclide product at a more appropriate time. By using an eluent having an appropriate dissolving power, it is possible to simplify the separation and purification treatment necessary after the irradiation with the radioactive ray, and thus the generation of the radioactive waste along with the separation and purification and the radiation exposure received by the worker are also reduced.

Other Treatment Examples

In the radionuclide production system 100 shown in FIG. 1, the target container 20 is configured to pass the eluent 30 in one direction in the accommodated target material 10. According to the configuration in which the eluent 30 is passed through the target material 10 in one direction, the eluent can be recovered continuously. However, the target container 20 can be configured to immerse the accommodated target material 10 in the eluent 30 (see FIG. 2).

Figure 2A:
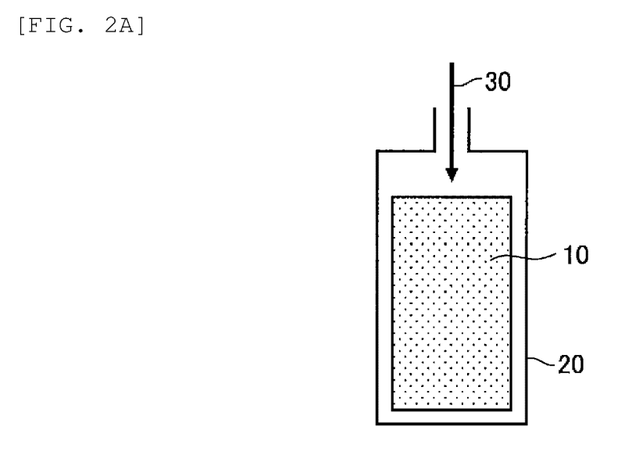
FIG. 2A is a diagram showing a treatment example (supply) in which a target material is brought into contact with an eluent.
Figure 2B:
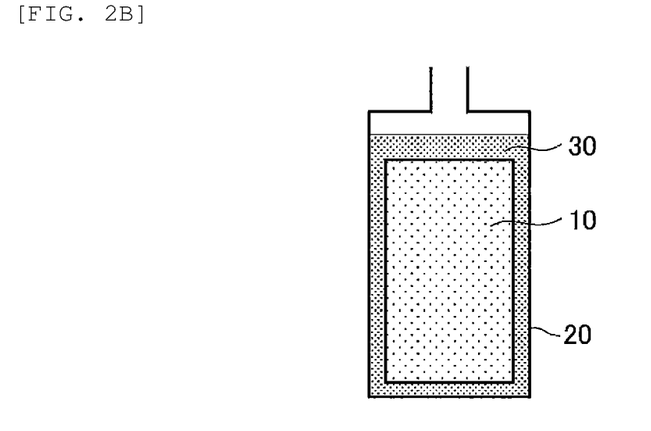
FIG. 2B is a diagram showing a treatment example (immersion) in which the target material is brought into contact with the eluent.
Figure 2C:
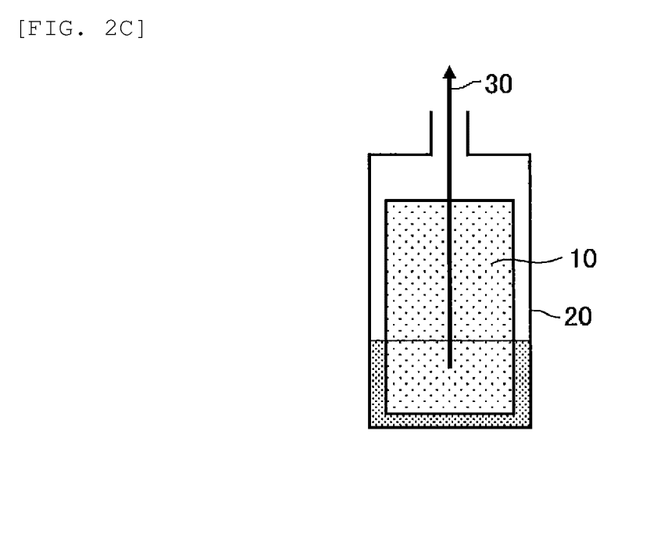
FIG. 2C is a diagram showing a treatment example (discharging) in which the target material is brought into contact with the eluent.

FIG. 2 is a diagram showing a treatment example in which the target material is in contact with the eluent. FIG. 2A is a diagram schematically showing a state in which the eluent 30 is being supplied to the target container 20. FIG. 2B is a diagram schematically showing a state in which the target material 10 accommodated in the target container 20 is immersed in the eluent 30. FIG. 2C is a diagram schematically showing a state in which the eluent 30 is being discharged from the target container 20.

As shown in FIG. 2, in a case where the target material 10 is immersed in the eluent 30, the liquid inlet and outlet can be provided on one end side of the target container 20. The inlet and outlet of the target container 20 can be individually connected to the eluent supply device 2 and the recovery container 5 via a branched liquid pipe. As a pump that supplies the eluent 30 to the target container 20, a syringe pump, a diaphragm pump, a piston pump, or the like can be used.

In the case where the target material 10 is immersed in the eluent 30, the treatment of bringing the target material into contact with the eluent can be performed, for example, after the irradiation with the radioactive ray. The eluent 30 is supplied to the target container 20 accommodating the target material 10 irradiated with the radioactive ray (see FIG. 2A), and the target material 10 is immersed in the eluent 30 (see FIG. 2B). Then, the target radionuclide can be recovered by discharging the eluent 30 from the target container 20 (see FIG. 2C).

Alternatively, the treatment of bringing the target material into contact with the eluent can be performed during the irradiation with the radioactive ray. The target material 10 is irradiated with the radioactive ray in a state in which the eluent 30 is supplied to the target container 20 accommodating the target material 10 (see FIG. 2A), and the target material 10 is immersed in the eluent 30 (see FIG. 2B). When the target radionuclide is generated by a nuclear reaction or radioactive decay, a substance containing the target radionuclide is eluted into the eluent 30 in the target container 20. Then, the target radionuclide can be recovered by discharging the eluent 30 from the target container 20 (see FIG. 2C).

According to the configuration in which the target material 10 is immersed in the eluent 30 as shown in FIG. 2, the eluent 30 can be reliably brought into contact with the entire target material 10. For example, if an appropriate immersion liquid amount or an appropriate immersion time is secured, since continuous passing through of the eluent 30 is unnecessary, the eluent 30 containing the target radionuclide at a high concentration can also be recovered. In such a case, it is possible to simplify the concentration adjustment treatment of adjusting the concentration of the radionuclide.

Although the embodiments of the radionuclide production method and the radionuclide production system according to the invention have been described above, the invention is not limited to the embodiments described above, and various modifications are included as long as these modifications do not depart from the technical scope. For example, the above-described embodiments are not necessarily limited to having all the configurations described above. In addition, a part of the configuration of a certain embodiment may be replaced with another configuration, or another configuration may be added to the configuration of a certain embodiment. A part of the configuration of a certain embodiment may be added with another configuration, deleted, or replaced with a configuration.

For example, the radionuclide production system 100 described above includes, as a unit that brings the target material 10 into contact with the eluent 30, the eluent supply device 2 that automatically passes the eluent 30. However, the radionuclide production system 100 may include, as a unit that brings the target material 10 into contact with the eluent 30, a manual type instrument or the like that manually passes the eluent 30. Specific examples of such an instrument include a container such as a beaker, a vial, a flask, and a petri dish, a syringe, a pipette, and a funnel.

In addition, the radionuclide production system 100 includes the target container 20 that accommodates the target material 10. However, the radionuclide production system 100 may be configured to directly handle the target material 10 with a manipulator or the like in a hot cell without accommodating the target material 10 in the target container 20. In a case of such a configuration, the treatment of bringing the target material 10 into contact with the eluent 30 can be performed using the manual type instrument or the like. As the elution unit constituting the radionuclide production system, such a manual type instrument, a column that accommodates the target material 10, a container, and the like can be provided.

EMBODIMENTS

Next, the invention will be described in detail with reference to the embodiments, but the technical scope of the invention is not limited thereto.

First Embodiment

As a first embodiment, a production example of actinium 225, in which radium 226 is used as a starting material, will be described. In this production method, a nuclear reaction [226Ra (γ, n) 225Ra] by a bremsstrahlung ray and β-decay of radium 225 are used.

Figure 3:
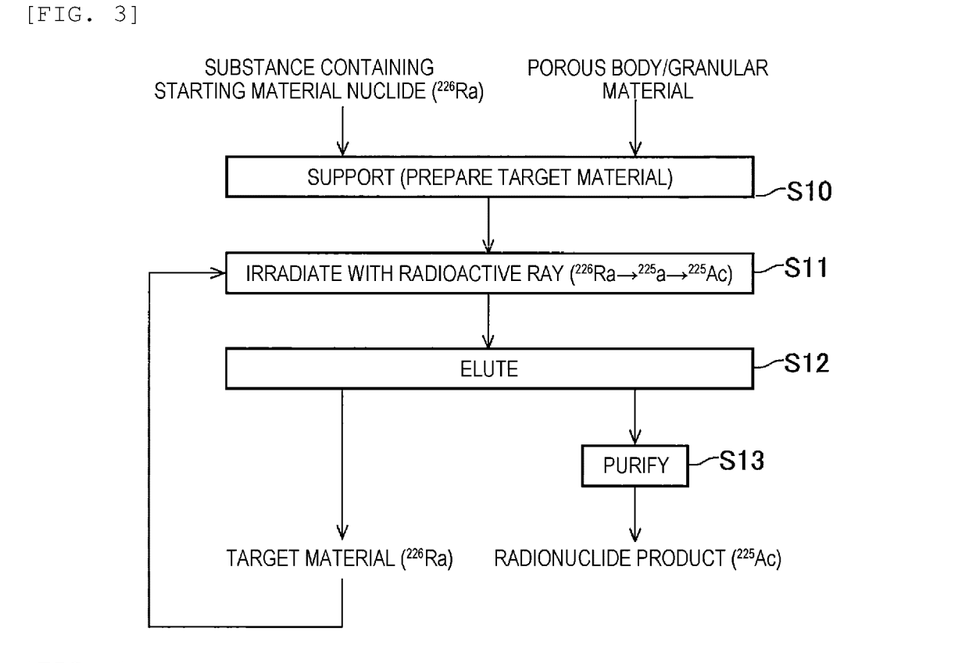
FIG. 3 is a flowchart showing a radionuclide production method according to a first embodiment.

FIG. 3 is a flowchart showing a radionuclide production method according to the first embodiment.

As shown in FIG. 3, the radionuclide production method according to the first embodiment includes: a supporting step S10 of supporting a substance containing a starting material nuclide on a surface of a target material to prepare the target material in which the starting material nuclide is present; a radioactive ray irradiation step S11 of irradiating, with a radioactive ray, the target material in which the starting material nuclide is present, to generate a radionuclide; an elution step S12 of eluting the radionuclide into an eluent by bringing the target material into contact with the eluent; and a purification step S13 of purifying the eluent.

In the supporting step S10, the target material is prepared by supporting a substance containing radium 226, which is the starting material nuclide, on a porous body or a granular material. As a carrier that supports radium, for example, a clay mineral such as montmorillonite and vermiculite can be used. In a case where a pressure is applied to liquid passing, the clay mineral may be used as a secondary carrier, and the secondary carrier may be supported in advance on the porous body or the granular material such as silicon dioxide.

A chemical form of radium 226 is a radium ion ($Ra^{2+}$). A target material to which radium 226 ($^{226}Ra^{2+}$) is adsorbed is obtained by dissolving, for example, radium chloride containing radium 226 in water and bringing the obtained solution into contact with a carrier.

In the radioactive ray irradiation step S11, the target material in which radium 226 is present is irradiated with the bremsstrahlung ray. When an electron beam accelerated by a linear accelerator or the like is emitted to a target for radioactive ray generation, bremsstrahlung occurs in the target for radioactive ray generation, and the bremsstrahlung ray is emitted to radium 226. Radium 225 is generated by the nuclear reaction by the bremsstrahlung ray, and actinium 225 is generated by the β-decay of radium 225. The irradiation with the electron beam can be continued until radium 225 necessary for generating a predetermined amount of actinium 225 is generated.

In the elution step S12, actinium 225 generated in the target material is eluted into the eluent and recovered. As the eluent, water, a sodium chloride aqueous solution, diluted hydrochloric acid, diluted nitric acid, a diluted alkali aqueous solution, or the like is preferably used.

Publications (Yoshio Takahashi et al., "Environmental Geochemistry of Radium: Field Survey and Approach from Ion Systematics", Dawn Research Report (2017), Japan Atomic Energy Agency, Japan Atomic Energy Department, Advanced Science Research Center, [searched on Jun. 4, 2019], Internet <URL: https://asrc.jaea.go.jp/publication/files/report201706.pdf>) reports the adsorption characteristics of radium.

According to these publications, the field survey and the like have suggested that ion adsorption with respect to the clay mineral (montmorillonite, vermiculite) depends on an ionic radius. An ion having an ionic radius larger than that of barium ions ($Ba^{2+}$) forms an inner-sphere complex with respect to the clay mineral, and an ion having an ionic radius smaller than that of the barium ions ($Ba^{2+}$) forms an outer-sphere complex with respect to the clay mineral. While the inner-sphere complex is relatively stable, the outer-sphere complex has a property of being easily dissociated.

The ionic radius of the barium ion ($Ba^{2+}$) is 1.42 Å (8 coordinations) and 1.35 Å (6 coordinations). In contrast, the ionic radius of the radium ion ($Ra^{2+}$) is as large as 1.48 Å (8 coordinations). On the other hand, the ionic radius of an actinium ion ($Ac^{3+}$) is as small as 1.12 Å (6 coordinations).

Therefore, it can be said that radium 226, which is the starting material nuclide, and radium 225, which is the non-target nuclide, strongly adsorb the clay mineral by forming an inner-sphere complex with respect to the clay mineral. On the other hand, it can be said that actinium 225, which is the target radionuclide, is easily dissociated by forming an outer-sphere complex with respect to the clay mineral. The ion adsorption with respect to the clay mineral depends on the pH and the ion intensity. Therefore, the target actinium 225 can be recovered by using an eluent that adjusts the pH and the ion intensity.

The target material after contact with the eluent in the elution step S12 can be reused for the generation of the target actinium 225. Unreacted radium 226 may remain in the target material in which the target actinium 225 is separated in the elution step S12. Therefore, by re-performing the radioactive ray irradiation step S11 using the remaining radium 226 as the starting material nuclide, actinium 225 can be reproduced without discarding the target material. After bringing the target material into contact with the eluent, the target material can be subjected to a washing treatment or a drying treatment as necessary.

On the other hand, the eluent in which the target actinium 225 has been recovered in the elution step S12 is subjected to the purification step S13 to remove impurities such as the non-target nuclides and eluent components. The purified liquid containing the target radionuclide can be commercialized as a radionuclide product. The eluent can be subjected to a sterilization treatment, a liquid property adjustment treatment, a concentration adjustment treatment, and the like according to a standard of a radioactive medicine or the like. In a case where the eluent meets the standard, the purification step S13 and other post-treatments can be omitted.

Second Embodiment

As a second embodiment, a production example of technetium 99m, in which molybdenum 100 is used as a starting material, will be described. In this production method, a nuclear reaction [100Mo(γ,n) 99Mo] by a bremsstrahlung ray and β-decay of molybdenum 99 are used.

Figure 4:
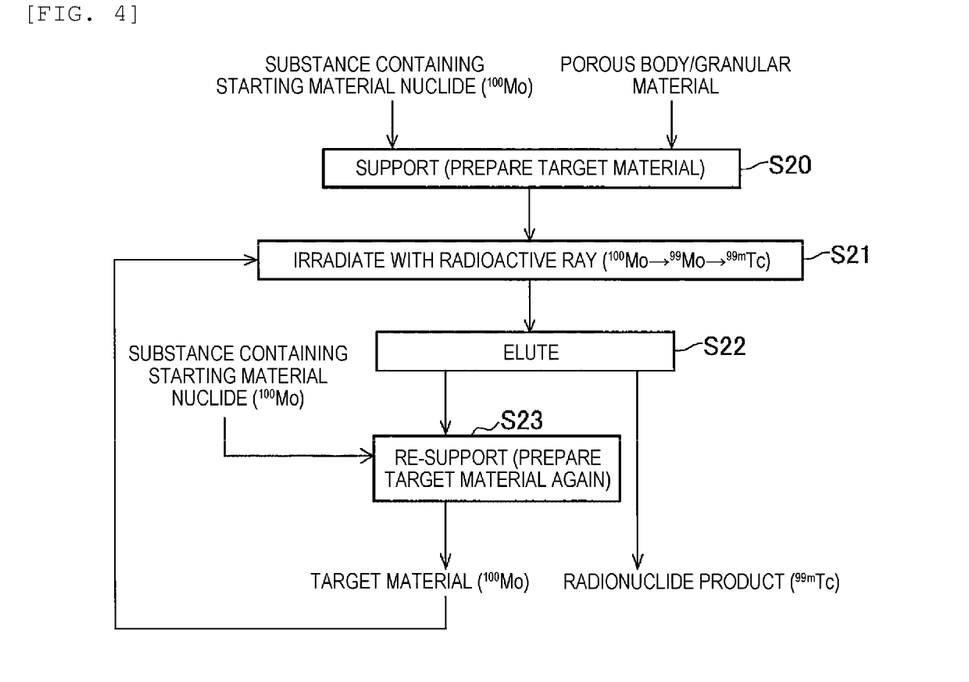
FIG. 4 is a flowchart showing a radionuclide production method according to a second embodiment.

FIG. 4 is a flowchart showing a radionuclide production method according to the second embodiment.

As shown in FIG. 4, the radionuclide production method according to the second embodiment includes a supporting step S20 of supporting a substance containing a starting material nuclide on a surface of a target material to prepare a target material in which the starting material nuclide is present; a radioactive ray irradiation step S21 of irradiating, with a radioactive ray, the target material in which the starting material nuclide is present, to generate a radionuclide; an elution step S22 of eluting the radionuclide into an eluent by bringing the target material into contact with the eluent; and a re-supporting step S23 of re-supporting the substance containing the starting material nuclide on the surface of the target material to regenerate the target material in which the starting material nuclide is present.

In the supporting step S20, the target material is prepared by supporting a substance containing molybdenum 100, which is the starting material nuclide, on a porous body or a granular material. As a carrier that supports molybdenum, for example, alumina, fibrous quartz, silica gel, activated carbon, or the like can be used.

A chemical form of molybdenum 100 is a molybdate ion ($MoO_4^{2-}$). A target material to which molybdenum 100 ($^{100}MoO_4^{2-}$) is adsorbed is obtained by dissolving, for example, molybdenum trioxide or metal molybdenum containing molybdenum 100 in an alkaline aqueous solution and bringing the obtained solution into contact with a carrier.

In the radioactive ray irradiation step S21, the target material in which molybdenum 100 is present is irradiated with the bremsstrahlung ray. When an electron beam accelerated by a linear accelerator or the like is emitted to a target for radioactive ray generation, bremsstrahlung occurs in the target for radioactive ray generation, and the bremsstrahlung ray is emitted to molybdenum 100. Molybdenum 99 is generated by the nuclear reaction by the bremsstrahlung ray, and technetium 99m is generated by the β-decay of molybdenum 99. The irradiation with the electron beam can be continued until molybdenum 99 necessary for generating a predetermined amount of technetium 99m is generated.

In the elution step S22, technetium 99 generated in the target material is eluted into the eluent and recovered. As the eluent, a sodium chloride aqueous solution such as saline solution is preferably used. The molybdate ion has a strong adsorption power with respect to a carrier such as alumina, while a pertechnetate ion has a weak adsorption power with respect to a carrier such as alumina. Therefore, the target technetium 99m can be recovered by using an eluent that adjusts the pH and the ion intensity.

The target material after contact with the eluent in the elution step S22 can be reused for the generation of the target technetium 99m. Unreacted molybdenum 100 may remain in the target material in which the target technetium 99m is separated in the elution step S22. Therefore, by re-performing the radioactive ray irradiation step S21 using the remaining molybdenum 100 as the starting material nuclide, technetium 99m can be reproduced without discarding the target material.

In the re-supporting step S23, the target material can be replenished with the substance containing the starting material nuclide before the target material is reused for the generation of the radionuclide. A target material to which molybdenum 100 ($^{100}MoO_4^{2-}$) is adsorbed and re-supported is obtained when dissolving, for example, molybdenum trioxide or metal molybdenum containing molybdenum 100 in an alkaline aqueous solution and bringing the obtained solution into contact with the target material.

On the other hand, the eluent in which the target technetium 99m has been recovered in the elution step S22 can be commercialized as a radionuclide product containing the target radionuclide. The eluent can be subjected to a separation and purification treatment, a sterilization treatment, a liquid property adjustment treatment, a concentration adjustment treatment, and the like according to a standard of radioactive medicine or the like. Ina case where the eluent meets the standard, these post-treatments can be omitted. In general, the nuclear reaction of molybdenum 100 hardly generates nuclides other than molybdenum 99, and thus the separation and purification treatment is unnecessary. As the milling in the related art, an operation of dissolving molybdenum 99 in a liquid form capable of passing liquid becomes unnecessary.

Third Embodiment

As a third embodiment, a production example of scandium 47, in which titanium 48 is used as a starting material, will be described. In this production method, a nuclear reaction [48Ti(γ,p)47Sc] by a bremsstrahlung ray is used.

Figure 5:
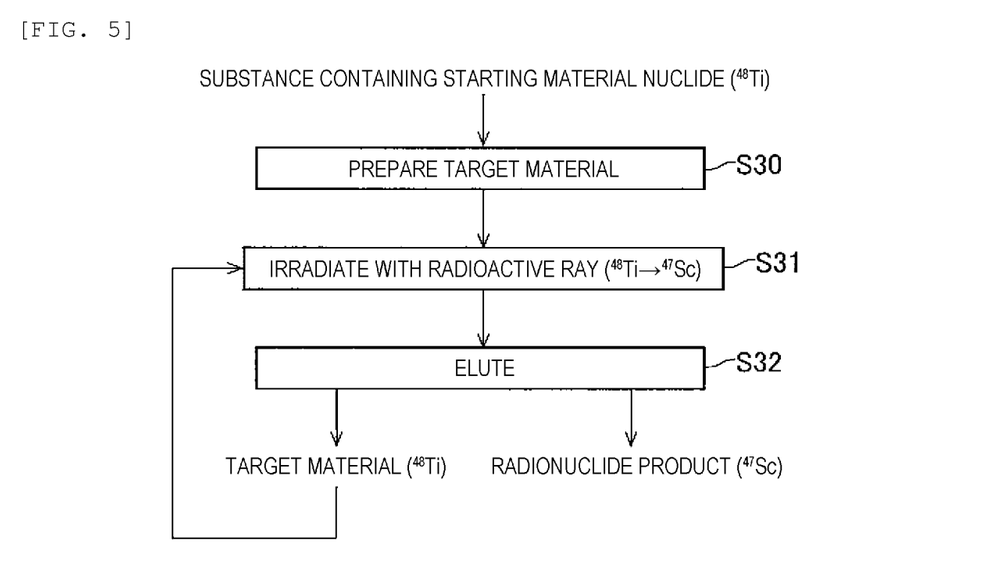
FIG. 5 is a flowchart showing a radionuclide production method according to a third embodiment.

FIG. 5 is a flowchart showing a radionuclide production method according to the third embodiment.

As shown in FIG. 5, the radionuclide production method according to the third embodiment includes: a preparation step S30 of preparing a target material, in which a starting material nuclide is present, by using a substance containing the starting material nuclide; a radioactive ray irradiation step S31 of irradiating, with a radioactive ray, the target material in which the starting material nuclide is present, to generate a radionuclide; and an elution step S32 of eluting the radionuclide into an eluent by bringing the target material into contact with the eluent.

In the preparation step S30, the target material, which is a porous body or a granular material, is prepared from substance containing titanium 48, which is the starting material nuclide. The chemical form of titanium 48 is metal titanium. For example, metal titanium can be used as a porous structure such as a metal mesh and a metal sponge obtained by a crawl method or the like, or as a granular material such as a particle and a pellet. Titanium 48 is a stable isotope having a natural abundance ratio of about 74%. In the preparation of the target material, titanium having a natural abundance ratio may be used, but titanium having an abundance ratio of titanium 48 higher than the natural abundance ratio is more preferable.

In the radioactive ray irradiation step S31, the target material in which titanium 48 is present is irradiated with the bremsstrahlung ray. When an electron beam accelerated by a linear accelerator or the like is emitted to a target for radioactive ray generation, bremsstrahlung occurs in the target for radioactive ray generation, and the bremsstrahlung ray is emitted to titanium 48. Scandium 47 is generated by the nuclear reaction by the bremsstrahlung ray. The irradiation with the electron beam can be continued until a predetermined amount of scandium 47 is generated.

In the elution step S32, scandium 47 generated in the target material is eluted into the eluent and recovered. As the eluent, water, diluted hydrochloric acid, diluted nitric acid, or the like is preferably used. Titanium is not dissolved in water, hot water, diluted hydrochloric acid, nitric acid, alkali or the like, but scandium is dissolved in water, hot water, diluted hydrochloric acid, nitric acid, or the like. Therefore, the target scandium 47 can be recovered by an eluent having such a dissolving characteristic.

The target material after contact with the eluent in the elution step S32 can be reused for the generation of the target scandium 47. Unreacted titanium 48 may remain in the target material in which the target scandium 47 is separated in the elution step S32. Therefore, by re-performing the radioactive ray irradiation step S31 using the remaining titanium 48 as the starting material nuclide, scandium 47 can be reproduced without discarding the target material. After bringing the target material into contact with the eluent, the target material can be subjected to a washing treatment or a drying treatment as necessary.

On the other hand, the eluent in which the target scandium 47 has been recovered in the elution step S32 can be commercialized as a radionuclide product containing the target radionuclide. The eluent can be subjected to a separation and purification treatment, a sterilization treatment, a liquid property adjustment treatment, a concentration adjustment treatment, and the like according to a standard of radioactive medicine or the like. In a case where the eluent meets the standard, these post-treatments can be omitted. In general, since the nuclear reaction of titanium 48 hardly generates nuclides other than scandium 47, in a case where titanium 48 has a high abundance ratio, the separation and purification treatment becomes unnecessary.

As an isotope of titanium, there is titanium 46 having a natural abundance ratio of about 8%. Titanium 46 causes a nuclear reaction [46Ti($\gamma$,2n)44Ti] by a bremsstrahlung ray to generate titanium 44. Titanium 44 decays into scandium 44 by electron capture. Since the half-life of titanium 44 is as long as about 60 years, the amount of scandium 44 mixed into the target scandium 47 is very small at an initial stage after irradiation with the radioactive ray. However, when the mixing of scandium 44 is not preferable, the purity of the target scandium 47 can be increased by completing the elution step 32 before a generation amount of scandium 44 reaches a significant value. On the other hand, scandium 44 can be produced by preparing the target material with titanium 46.

REFERENCE SIGN LIST

100: radionuclide production system
1: radioactive ray irradiation device (irradiation unit)
2: eluent supply device (elution unit)
3: liquid pipe
4: liquid pipe
5: recovery container
10: target material
20: target container
30: eluent (liquid)

The invention claimed is:

1. A radionuclide production method comprising:
a step of irradiating, with a radioactive ray, a target material in which a starting material nuclide is present, to generate a radionuclide; and
a step of eluting the radionuclide into a liquid by bringing the target material into contact with the liquid; and
after the step of eluting, reusing the target material in production of the radionuclide,
wherein the target material is a porous body or a granular material through which the liquid is passable,
wherein the starting material nuclide is radium, rhenium, hafnium, germanium or zinc,
wherein the method further comprises supplementing the target material with a substance containing the starting material nuclide before the reusing of the target material for the production of the radionuclide.

2. The radionuclide production method according to claim 1,
wherein the target material contains an inorganic substance.

3. The radionuclide production method according to claim 1,
wherein the target material is a compound containing the starting material nuclide.

4. The radionuclide production method according to claim 1,
wherein the target material supports, on a surface, a substance containing the starting material nuclide.

5. The radionuclide production method according to claim 4,
wherein the target material supports the substance containing the starting material nuclide by adsorption, electrodeposition, vapor deposition, or coating.

6. The radionuclide production method according to claim 1,
wherein the liquid is a liquid in which an elution amount of a substance containing the radionuclide is larger than an elution amount of a substance containing the starting material nuclide.

7. The radionuclide production method according to claim 1,
wherein the liquid is water, a sodium chloride aqueous solution, hydrochloric acid, nitric acid, or an alkaline aqueous solution.

8. The radionuclide production method according to claim 1,
wherein the eluting comprises passing the liquid through the target material or a treatment of immersing the target material in the liquid.

* * * * *